Oct. 30, 1951 C. E. JENKINS 2,573,573
RECIPROCATING BLADE WOOD SAW
Filed May 27, 1946 3 Sheets-Sheet 1
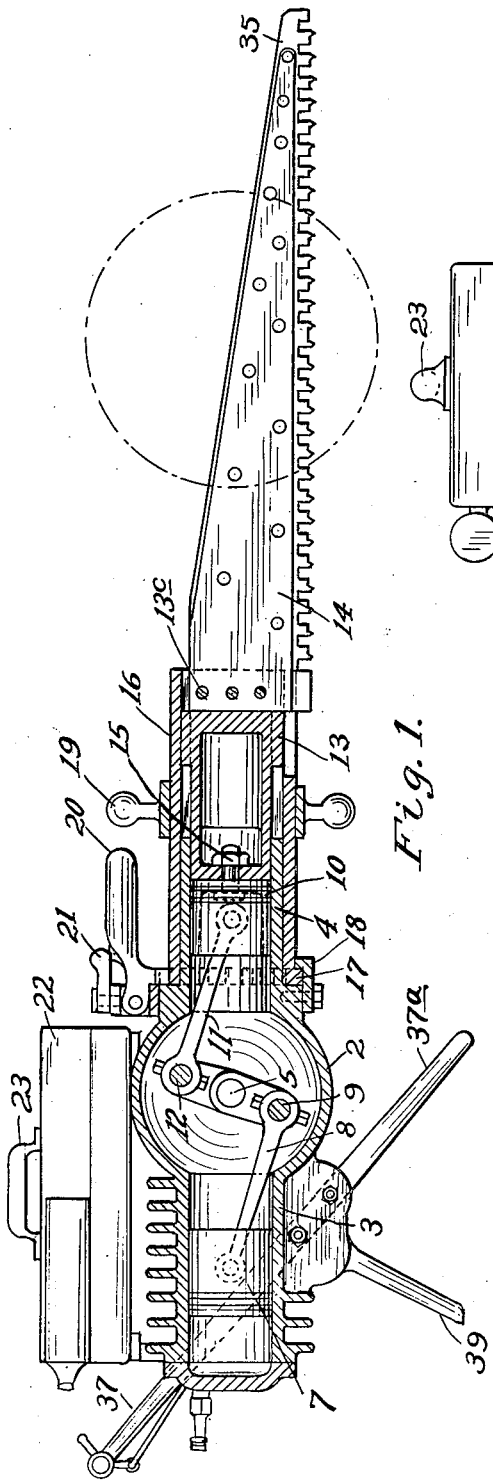
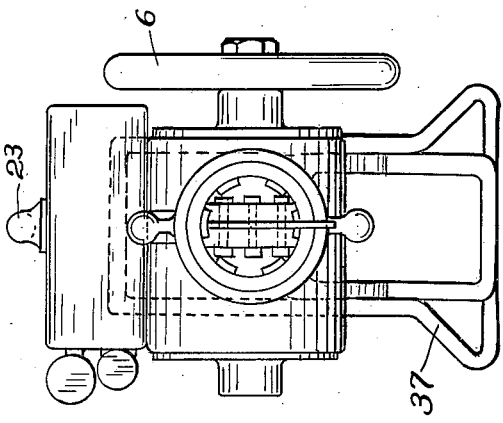
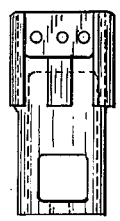
INVENTOR.
Clarence E. Jenkins
BY
Christy, Parmelee & Strickland
attorney Oct. 30, 1951 C. E. JENKINS 2,573,573
RECIPROCATING BLADE WOOD SAW
Filed May 27, 1946 3 Sheets-Sheet 2
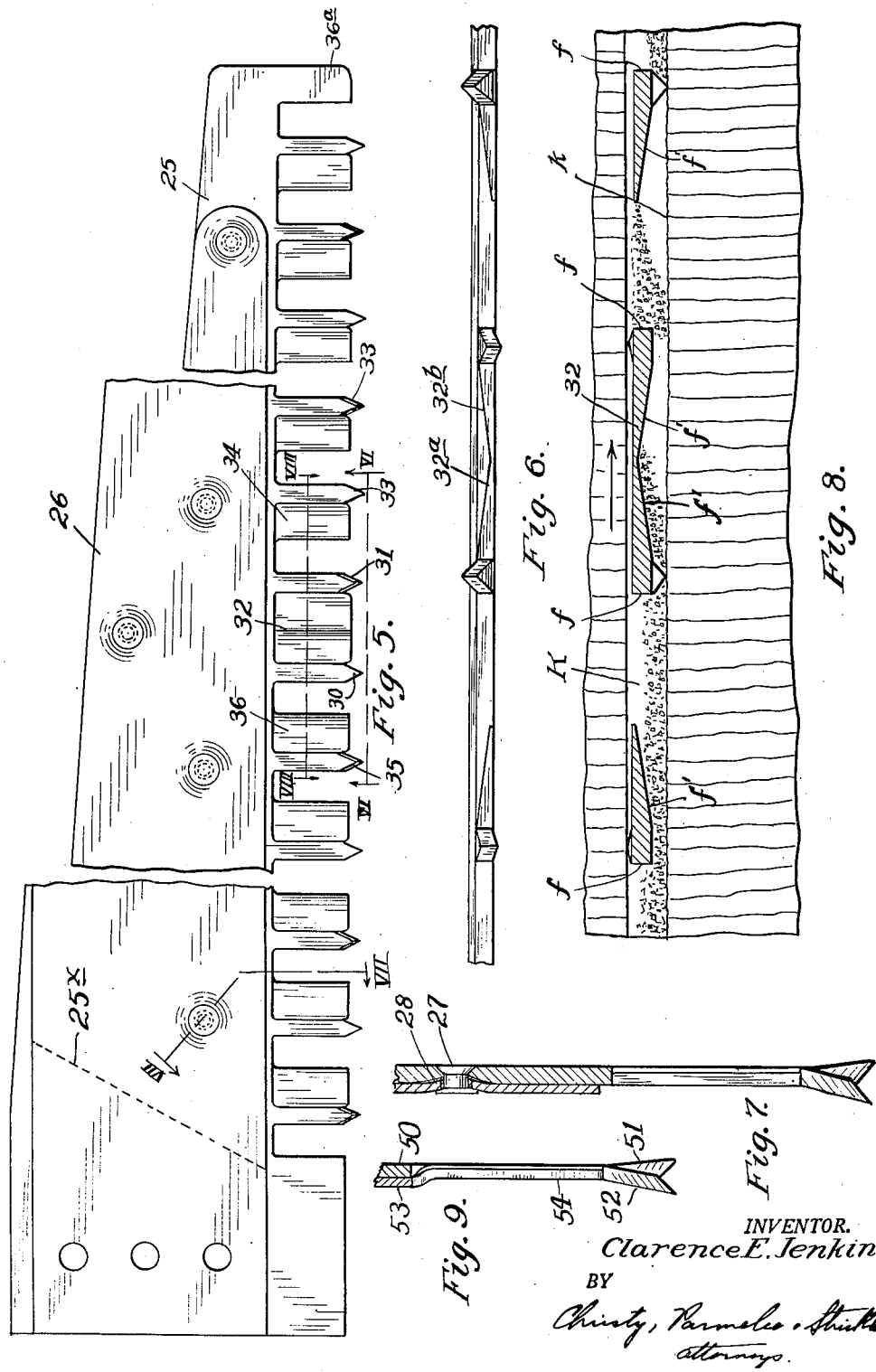
INVENTOR.
Clarence E. Jenkins
BY
Christy, Parmelee & Strickland
Attorneys.

Oct. 30, 1951           C. E. JENKINS           2,573,573
RECIPROCATING BLADE WOOD SAW
Filed May 27, 1946           3 Sheets-Sheet 3
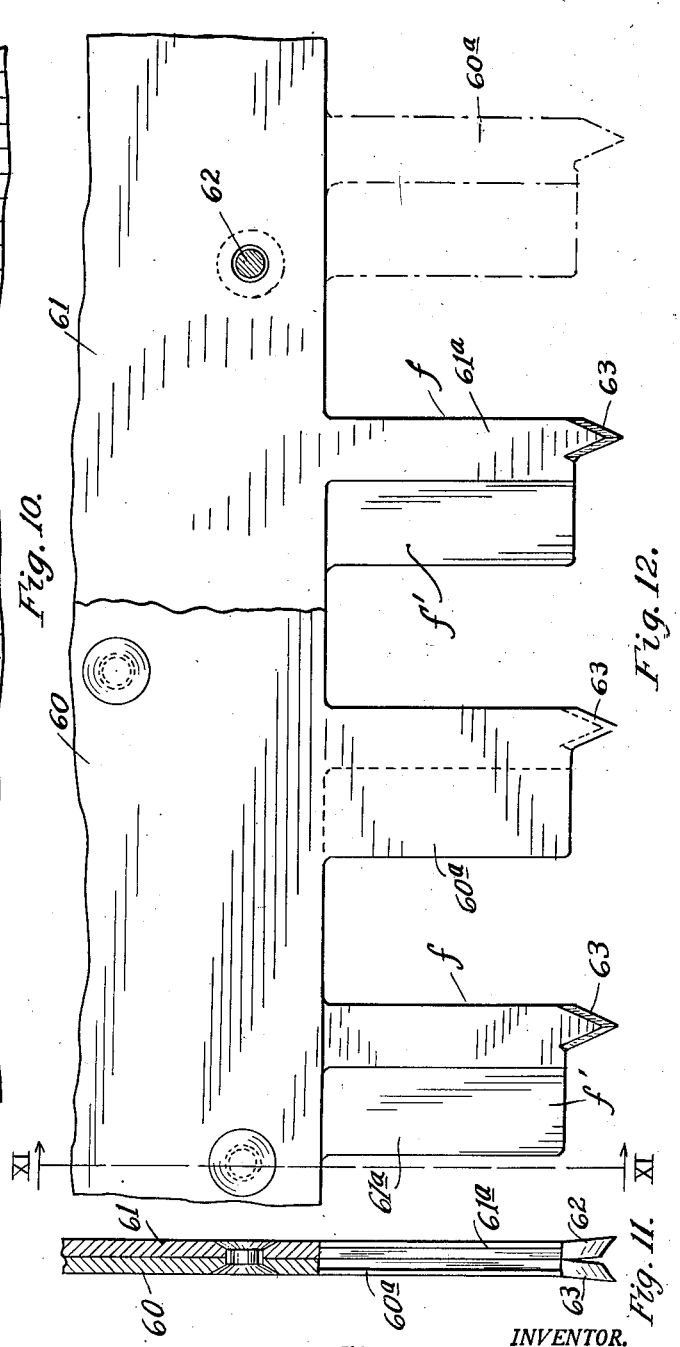
INVENTOR.
Clarence E. Jenkins
BY
Christy, Parmelee & Strickland
attorneys Patented Oct. 30, 1951

2,573,573

UNITED STATES PATENT OFFICE 2,573,573

RECIPROCATING BLADE WOOD SAW

Clarence E. Jenkins, Westmoreland, N. H., assignor to Bocji Corporation, Pittsburgh, Pa., a corporation of Delaware, as trustee Application May 27, 1946, Serial No. 672,597

21 Claims. (Cl. 143—68)

This invention is for a power-driven wood saw of the reciprocating blade type, and is for an improved portable power-driven saw. It is designed especially for the cutting of logs, felling of trees, and other rough cutting operations, rather than for carpentry or fine cabinet work, but it may be used for any purpose to which it is found applicable.

It has heretofore been proposed to operate a cross-cut saw by power, utilizing a crank mechanism of some type to reciprocate the blade, but such arrangements have contemplated a long, relatively slow stroke of the saw, and were not conveniently portable, and their utility was limited. Other power-driven saws adapted to be carried in the hand have been developed to avoid the more cumbersome reciprocating saws above referred to, but they have generally used endless cutter chains or rotary cutter disks instead of a reciprocating blade. Such devices are relatively expensive or hazardous, and have certain limitations which restrict their utility. The present invention contemplates the use of a reciprocating blade moved through a short stroke at high speed.

Ordinarily in the operation of a reciprocating saw it has been necessary or desirable for the blade to have a long stroke so that the chips or sawdust which are removed from the wood by the action of the saw teeth will be carried through the cut or kerf in the log and discharged. If a conventional wood cutting saw were moved, say through only a two-inch stroke while cutting through a ten-inch log, it is apparent that the sawdust accumulating at the center of the cut would be merely moved back and forth with the two-inch sweep of the saw, and have no opportunity to be carried out of the kerf. This would seriously impede the efficiency of the saw.

According to the present invention the saw blade is provided with teeth constructed to remove the sawdust or chips from the kerf even though the blade have a short stroke.

With a short stroke, it is obviously necessary to operate at a high speed in order to do as much work as is accomplished by a long stroke saw operating at slower speed, and in order to get a high production from the saw. Due to the resilience of a conventional saw blade, when it is reciprocated at high speed there is a severe flexing action or vibration at the free end or tip of the blade. The present invention provides a saw blade which has the necessary flexibility, but in which provision is made for a damping of such destructive or undesirable vibration.

In a portable saw using a reciprocating action with a drive which is light enough so that the device can be readily carried about in the hand, there is a tendency when the saw encounters the work, for the driving rig to move back and forth, instead of the saw. This tendency is especially noticeable at speeds up to about 500 strokes per minute, becoming less as the speed of the saw increases. This is another reason why it is desirable to operate at a high speed, perhaps as high as 2000 or more strokes per minute, and another reason why provision must be made for preventing excessive vibration of the blade at high speeds.

According to the present invention, a saw blade is provided with especially arranged teeth designed to mechanically convey sawdust from the kerf. A damping strip is attached to the blade in such way as to effectively prevent undesirable vibration in the blade, even at speeds approaching or in excess of 2000 strokes per minute, and the arrangement of the teeth on the saw enable this damping means to be employed. Additionally the invention provides in a reciprocating saw a driving rig capable of imparting to the saw a short stroke at high speed, which driving rig is relatively light and easily handled. Provision is made whereby the blade may reciprocate in either a vertical or horizontal plane, or may be adjusted to an intermediate angle.

My invention may be readily understood by reference to the accompanying drawings, in which:

Fig. 1 is a view partly in side elevation and partly in longitudinal section of a saw and driving rig embodying my invention;

Fig. 2 is a front end view of the arrangement shown in Fig. 1;

Fig. 3 is a detail view showing one form of connection between the saw blade and engine for operating the blade;

Fig. 4 is a front elevation of the part shown in Fig. 3;

Fig. 5 is a side elevation on a larger scale than Fig. 1 of the saw blade itself, the view being approximately full size, but with portions of the length of the blade broken away;

Fig. 6 is an enlarged bottom plan view of the blade of Fig. 5;

Fig. 7 is a transverse section in the plane of line VII—VII of Fig. 5;

Fig. 8 is a horizontal section in approximately the plane of the line VIII—VIII of Fig. 5, looking down into a kerf in a log in which the saw is operating, to illustrate the manner in which sawdust is conveyed from the kerf;

Fig. 9 is a transverse section through a slightly modified form of blade;

Fig. 10 is a view similar to Fig. 8 showing a modified form of saw in which the sawdust conveying inclines are differently arranged;

Fig. 11 is a transverse section in the plane of line XI—XI of Fig. 12; and

Fig. 12 is a side view of the saw shown in Figs. 10 and 11, with a part of one of the saw elements broken away.

Referring first to Figs. 1 and 2, there is illustrated a simple two-cycle engine having opposed cylinders, the crank case of the engine being designated 2, and the opposed cylinders being designated 3 and 4. 5 designates a crank shaft which is provided with a fly wheel 6. The cylinder 3 is a power cylinder having a piston 7 therein connected to the crank shaft through a connecting rod 8 and crank 9. The cylinder 4 is a guide cylinder having a piston-like element 10 therein connected to the crank shaft through a connecting rod 11 and crank pin 12. The usual carburetion and ignition devices have not been shown, these being well known in the art, and forming no part of the present invention.

Secured to the piston 10 is a connector 13 which is shown in detail in Figs. 3 and 4, and which has a reduced bifurcated outer end portion 13a in which the root or large end of the saw blade 14 is received. Rivets or other fastening means 13c serve to immovably and rigidly connect the saw blade to the connector 13.

The arrangement is such that when the piston 7 is being driven in the manner of the piston of a two-cycle engine for example, rotation is transmitted to the crank shaft, and the saw blade is caused to reciprocate, the stroke of the saw being about the same as the stroke of the piston in the power cylinder.

In order to enable the saw blade to operate in different planes relative to the axis of the crank shaft, the connector 13 is attached to the piston 10 by a single bolt and nut 15, this providing in effect a swivel to enable the coupling or connector 13 to rotate relative to the piston on which it is otherwise rigidly carried. The coupling 13 is provided with a plurality of splines or key elements 13b which interfit with the correspondingly arranged slideways or grooves formed on the interior of a sleeve 16 which is fitted about the cylinder 4. This cylinder or guide sleeve 16 is provided with a notched flange 17 at its inner end with a keeper ring 18 on the crank case serving to restrain the sleeve 16 from endwise movement while permitting it to rotate. Knobs 19 are provided on the guide sleeve 16 to facilitate rotation of it. A pivoted lever 20, secured to the top of the crank case, has a lug which may be selectively entered in one of the notches on the flange 17 to restrain the sleeve 16 from rotating, but when it is desired to adjust the angle of the saw, the lever 20 may be lifted to permit the sleeve to be turned and locked in some other position. In order to prevent accidental operation of the locking lever 20, there may be a pivoted latch 21 that can be swung over the top of the lever 20 to prevent it from being lifted, or may be swung clear of the lever 20 to permit the lever 20 to be moved.

The engine may be provided with a fuel tank 22 secured to the top thereof, and on the top of the fuel tank 22 there is preferably provided a handle 23 which enables the saw to be easily carried about.

The saw 14 comprises a blade 25 formed of steel as commonly used in saws. Since the saw is primarily intended to be supported in the hand of the operator, misalignment or inaccurate alignment is likely to be the rule rather than the exception, and therefore the blade should be reasonably thin and resilient or flexible. As previously pointed out, such a resilient blade operating on a short stroke at high speed tends to vibrate excessively. For the purpose of damping vibration, a damping strip is attached to the side of the blade. This damping strip comprises a resilient metal plate 26 which is applied to one side of the saw blade 25, and which is immovably attached to the blade at the root end of the saw. It may be held immovable with reference to the blade by the bolts or rivets 13c that connect the saw blade to the coupling or connector 13, and may also be brazed or welded thereto, the diagonal dotted line 25x in Fig. 5 indicating the approximate limit of the brazed or welded area. Forwardly from the root end of the saw the damping strip is attached to the blade at numerous points by rivets 27 that pass through the damping strip and through the saw blade (see Fig. 7), the hole in the damping strip through which the rivets pass being slightly larger than the rivets themselves, as indicated at 28 in Fig. 7, whereby there may be slight relative movement between the blade and the damping strip. Additionally the blade of the saw is preferably depressed at the places where the rivets are located, so that the metal of the damping strip is bowed in very slightly under the heads of the rivets and the heads of the rivets are flush with the outer surface of the damping strip. At the opposite side of the saw the rivets are countersunk into the blade of the saw. The damping strip 26 is of a thickness less than the thickness of the blade of the saw.

The application of the damping strip to the blade of the saw does not substantially impair the resilience of the blade so that the saw accommodates itself to any misalignment. At the same time the damping strip and the blade of the saw have different natural frequencies of vibration so that they counteract one another, and the vibration of the blade is very substantially less than would be the vibration of a solid blade of the combined thickness of the two elements of my saw, while the resilience and flexibility is greater than that of a blade of the combined thickness of these two elements. The damping strip is substantially, although not entirely, coextensive with the face of the blade, but it does not extend down to the teeth which are on the lower edge of the blade 25.

The teeth of the saw are especially designed for the conditions under which the saw operates, and for a short, high-speed stroke. At or near the middle of the lower edge of the saw there is a double tooth arrangement having two cutting points 30 and 31. Between the two points there is a web portion 32, and this web portion, as shown in Fig. 6, has its rear surface flat and in the plane of the rear surface of the saw blade. For the purpose of terminology, the surface of the blade which is seen in elevation in Fig. 6 may be termed the "front" of the blade, and the opposite surface may be termed the "rear" or "rear face" of the blade, and the back surface of the web 32 is flush with the rear surface of the blade. The front of the web 32 slopes in opposite directions from a midpoint between the two teeth where the web is thinnest to the place where the webs merge into the teeth. The two sloping surfaces on the web are designated 32a and 32b.

Forwardly of the tooth 31 the teeth are all designated 33, and each tooth has a web portion 34 thereon, which web portion is at the rear edge of the tooth considered in a fore and aft direction, and each web 34 has its back surface flush with the back of the saw blade, and has its front surface inclined in the same direction as the surface 32b of the middle tooth. That is, the webs taper in thickness from the edge which is toward the middle to the edge which is toward the front end of the blade.

Back of the double tooth all of the teeth are designated 35, and they are just reversed to the teeth 33 in that they each have a web portion 36 which is on the forward edge of the tooth considered in the direction of the length of the blade, and this web 36 is tapered in the same way as the surface 32a of the web 32. With the exception of the middle tooth, all of the teeth are separated from one another, and their web portions are separated from adjacent teeth.

The distance between the teeth from point to point is substantially less than the maximum stroke of the saw. For example, if the saw has a two-inch stroke, the teeth should preferably not be more than one inch apart, and preferably should be somewhat closer together than this. All of the teeth are beveled on their points as is common with cross-cut saws. Every alternate tooth is "set" to the front of the blade to a substantial extent, that is, its point is turned from the plane of the saw blade toward the front as viewed in Fig. 5, while every intervening tooth has only a slight set in the opposite direction. About 90% of the total set of all of the teeth is toward the front. In this connection the saw is different from the usual cross-cut saw in which the teeth are set first in one side and then to the other side of the blade to an equal extent, and it is different from the usual cross-cut saw in which there are teeth having opposite sets which are pointed, and other "hook" or "rake" teeth having no set, and which are not pointed.

The set of the points of the blades which are turned toward the front of the blade is quite decided, as clearly shown in Fig. 7, so that the kerf cut by the saw will be of a width equal to the thickness of the blade 25 plus the thickness of the damping plate 26, with some clearance, so that the saw will not bind in the kerf, and a channel for the removal of sawdust, as hereinafter described, will be formed. It will be found with the teeth set in this manner that the surface of the kerf which is cut by the front of the blade will be somewhat rough, while the surface of the kerf at the back of the blade will be smooth. This is indicated to an exaggerated extent in Fig. 8, and it is of advantage in the operation of the saw. Fig. 8 is a more or less schematic view showing the teeth in transverse section, looking in toward the bottom of a kerf being cut through a piece of wood. When the saw is moving toward the right as viewed in Fig. 8, the transverse faces of all of the teeth forwardly of the center, which transverse faces are marked $f$, act as pushers to push the sawdust in the kerf toward the right. When the saw blade reverses, and the teeth start to move in the other direction, the inclined faces of the webs on the teeth, which in Fig. 8 are designated $f'$, tend to slide past the sawdust, merely wedging it out against the wall of the kerf from which it falls back into the space in front of the transverse surfaces $f$. Thus considering only the front half of the blade, every time it moves toward the right, the sawdust is pushed along with the blade, but every time the blade moves toward the left, the sawdust is merely displaced by the inclined surfaces which "ride" past the sawdust, and it has been found in practice the slight roughness on the wall $k$ of the kerf K contributes to the effectiveness of this method of carrying the sawdust out of the kerf. Of course, rearwardly of the middle tooth the transverse surfaces $f$ and the inclined surfaces $f'$ are effective in a manner just the reverse of the teeth forwardly of the center. That is, when the blade is moving toward the right the inclined surfaces $f'$ on the teeth to the left of the middle tend to ride past the sawdust, whereas when the saw blade moves toward the left, the transverse surfaces $f$ push the sawdust toward the left-hand end of the kerf. Since the overall stroke of the saw is at least as great as twice the distance between teeth, and preferably slightly greater, the sawdust must be systematically and progressively moved when the saw operates from the center toward the two ends of the kerf. It is moved a certain distance by one tooth, and because of the spacing of the teeth, the travel effected by one is overlapped by the travel of the next to progressively move the sawdust along the kerf. As above indicated, all sawdust to the right of the middle as viewed in Fig. 8 moves toward the right, and all to the left of the middle moves toward the left. Thus by providing the inclined webs, provision is made for the systematized and positive removal in an orderly fashion of the sawdust from the kerf.

At the extreme front end of the blade there is a typical guard knob 36a to protect the first tooth.

To summarize, the invention provides a machine which is adapted to be of small and light construction, so that it can be easily carried in the hand and operated by being held in the hand. For this purpose, it is necessary that the stroke be short, and for speedy and efficient operation the strokes must be faster than is possible by direct hand stroke. Hence it is necessary to provide some mechanism for reciprocating the blade through a short stroke at high speed, and this is conveniently accomplished by directly connecting the saw to the crank shaft of a small high-speed internal combustion engine, although various other operating arrangements may be used. Operating at this high speed, the blade will vibrate unless it is either very stiff, or a vibration damping means is included in the blade. A stiff blade is not desirable because the misalignment of the blade, requiring flexing of the blade, will not be an unusual condition. The present invention provides a blade with a high degree of flexibility, and which is provided with damping means to avoid excessive vibration. Moreover, because the stroke of the saw is very short as compared to the thickness or diameter of the log or board being sawed, means is provided in the present invention for systematically discharging the sawdust from the kerf. This discharge is effected in a direction parallel with the stroke of the saw. To remove the sawdust, the saw must cut a channel or kerf sufficiently wide to allow for the movement of the sawdust along the kerf, hence a thin blade with considerable set to the teeth in one direction, in conjunction with the webs on the teeth sloped in the manner described provides the channel for the sawdust and the means for conveying the sawdust along the channel. The wide kerf also provides clearance for the damping strip as the saw passes down into the wood or log being cut.

The extreme set to the teeth above referred to produces a rough surface kerf on one side of the wood, and this rough surface serves better than a smooth one to hold the sawdust while the incline on the webs of the teeth rides past the sawdust in one direction. In other words, the rough side of the kerf aids in keeping the sawdust from merely shuffling back and forth. I have found it to be undesirable to use the conventional V type teeth with an intermediate hooking tooth with a short stroke, high-speed saw, as it requires considerably more pressure to hold the saw down against the bottom of the kerf. Apparently the particles of sawdust moving back and forth under the hooking teeth prevent the blade from sawing as effectively as would the teeth herein disclosed.

If the distance between the cutting points of the teeth is as shown in Fig. 5, that is, about three-fourths of an inch, and if they are set alternately as described, the distance from one tooth point which has a substantial set to the next similar point will be an inch and a half.

With the saw stroke being but two inches, the overlap of the points is only half an inch, so that the speed-mass-relationship of the rig must be such that the rig does not move more than half an inch. In other words, there is a tendency for the engine, as well as the saw, to move back and forth as a result of the natural causes of action and reaction, and this back and forth movement of the engine must, in the specific example given, not be more than half an inch. I have found that with an engine weighing about 32 pounds, using the saw blade described, it can operate down to around 400 or 500 strokes per minute without the driving rig or engine moving more than a half inch. As the speed of the engine is increased toward 2000 R. P. M. the vibration of the engine diminishes and is practically unnoticeable at these higher speeds.

The arrangement described has a unique advantage, in that with most types of mechanically driven saws, some kind of protection must be interposed between the saw and the driving gear to prevent damage to the machine if the wood closes in and binds on the saw, as is frequently the case. It is unnecessary to provide any such clutch, shear pin or other protective coupling in the present invention, because if the saw blade becomes tightly wedged or pinched in the wood, the driving rig or engine can move back and forth without harm until the operator can stop the saw or release the blade.

The saw of the present invention, while being of extremely simple and light construction, also has the virtue of being relatively safe as compared with many other portable saws. Both a continuous chain saw and a rotating disk saw may catch the clothing of a person, tending to pull his arm or leg into the saw, whereas the short stroke saw of the present invention can pull only two inches at the most before moving in the opposite direction. The ordinary looseness of garments is such that this small pull would be unlikely to result in any harm to a person whose clothes inadvertently brushed against and became caught in the teeth of the blade while it was in operation.

It should be mentioned that the handle 23 is ordinarily used in carrying the saw, while the handle 37 attached to the back of the driving rig or engine may be used for sawing a log which is lying prone on the ground, or which is supported horizontally. The handle 37 extends down around each side of the cylinder and is rigidly connected to a bracket on the under side of the cylinder and has a portion 37a that extends below the cylinder to form a forwardly-projecting leg. Another frame or leg element 39 is also secured to this bracket 37a, thus providing a stand on which the saw may be set. At the outer end of the handle 37 are schematically illustrated control levers for the spark and throttle of the engine.

It may be noted that in using the saw the operator may employ either the handle 37 and the handle 23, or the handle 37 and the handle 20 for manipulating and regulating the saw, and it is for this reason that the latch 21 is provided for holding the handle 20 against accidental release.

In the arrangement shown in Fig. 9, the saw blade per se is designated 50 and has teeth 51 and 52 thereon. The damping plate 53 is provided with the conveying elements 54 corresponding to the tapered elements previously described. The conveyor elements 54 may be offset slightly from the plane of the damping plate 53 to come somewhat more directly between the teeth. In either form the saw is provided with conveying means or wedge-shaped elements that operate to move the material out of the kerf.

In the modifications shown in Figs. 10, 11 and 12 the saw, instead of comprising a saw blade and a damper strip, comprises two saw blade elements in face-to-face relation. One of these elements is designated 60 and the other 61, and they are riveted together by rivets 62 arranged the same way as the rivets 27 which secure the damping strip to the saw blade, the holes for the rivets being slightly larger than the rivets themselves, in order to permit slight relative movement.

In the arrangement shown in these figures, every alternate tooth is carried on the blade element 60, and every intervening tooth on the saw element 61. The teeth which are carried on the element 60 are designated 60a, and those which are carried on the saw element 61 are designated 61a. The teeth are so spaced that in the short stroke of the saw, the paths of travel of the teeth 60 and 61a will overlap so as to cut a kerf of uniform width.

In Fig. 10 the two middle saw teeth with inclines $f'$ in opposite direction are shown in section. To the right of the two middle teeth all of the teeth of both series 60a and 61a have inclined surfaces $f'$ which taper toward the center, the thickest portion of the incline being away from the center, and to the left of these two middle teeth the inclines are just the reverse.

The operation of the saw is the same as that previously described, except that the set of the teeth need only be such as to cut a kerf wide enough to accommodate the double-thickness blade. The sawdust is conveyed by the cooperation of the inclined surfaces $f'$ and transverse surfaces *f* in the same manner, except that the sawdust is caused to move back and forth from one side of the kerf to the other past the successive teeth as it moves to the ends of the kerf. In Figs. 10, 11 and 12 the tooth portions are in all cases designated 63. In this form the two saw blades would preferably be coextensive throughout the entire length and area, and at the root ends of the saw they would be rigidly secured together by soldering, brazing or welding, or other means as hereinbefore described.

The expression "short stroke" as used herein, and in the appended claims, contemplates a rectilinear movement of the blade in one direction of from around one and one-half inches to around three inches, about two inches normally being preferred, although these distances are not critical. The term "high speed" as used herein and in the appended claims has reference to speeds ranging from around 400 or 500 reciprocations per minute, these figures not being critical, but being substantially higher than action which is obtained by normal hand sawing.

While I have illustrated and described one present preferred embodiment of my invention, it will be understood that this is by way of illustration, and that various changes and modifications may be made therein within the contemplation of my invention and under the scope of the following claims.

I claim:

1. A saw having teeth along the cutting edge thereof, said teeth being separated from each other to provide a space therebetween, each of said teeth having a wedge-shaped web secured to one vertical edge thereof, each web tapering in thickness away from the tooth with which it is associated, the space between adjacent teeth extending inwardly from said edge sufficiently to separate the webs secured thereto from each other.

2. A saw having teeth along the cutting edge thereof, each of said teeth having a wedge-shaped web secured to one vertical edge thereof, each web tapering in thickness away from the tooth with which it is associated, all of the webs of the teeth at one side of a midpoint on the saw tapering in one direction and on the other side of the midpoint in the opposite direction.

3. A saw blade having teeth along the cutting edge thereof, each of said teeth having a wedge-shaped web secured to one vertical edge thereof, each web tapering in thickness away from the tooth with which it is associated, alternate teeth being sharply set to the same side of the blade and the intervening ones being only slightly set to the opposite side.

4. A saw having teeth along the cutting edge thereof, each of said teeth having a wedge-shaped web secured to one vertical edge thereof, each web tapering in thickness away from the tooth with which it is associated, all of the webs of the teeth at one side of a midpoint on the saw tapering in one direction and on the other side of the midpoint in the opposite direction, there being a doubly-tapered web between the two teeth nearest the midpoint.

5. A saw blade having teeth along the cutting edge thereof, each of said teeth having a wedge-shaped web secured to one vertical edge thereof, each web tapering in thickness away from the tooth with which it is associated, alternate teeth being sharply set to the same side of the blade and the intervening ones being slightly set to the opposite side, and a vibration damping plate on the side face of the blade toward which the teeth are sharply set.

6. A saw blade having teeth along the cutting edge thereof, there also being webs on the blade between adjacent teeth, which webs respectively have a taper which increases in thickness in a direction from a midpoint in the length of the blade toward the end of the blade adjacent which the respective web is positioned.

7. A saw blade having teeth along the cutting edge thereof, there also being webs on the blade between adjacent teeth, which webs respectively have a taper which increases in thickness in a direction from a midpoint in the length of the blade toward the end of the blade adjacent which the respective web is positioned, each web being attached to and merging at its thicker end into the tooth to which it is attached.

8. A saw blade having teeth along the cutting edge thereof, there also being webs on the blade between adjacent teeth, which webs respectively have a taper which increases in thickness in a direction from a midpoint in the length of the blade toward the end of the blade adjacent which the respective web is positioned, each web being attached to and merging at its thicker end into the tooth to which it is attached, alternate teeth being sharply set toward one side of the blade, the intervening teeth being only slightly set to the opposite side of the blade.

9. A flexible saw blade for high speed reciprocation having teeth along one edge thereof and a metal vibration damping plate carried on one surface of the blade, one end of the damping plate being rigidly and immovably attached to the blade, the rest of the length of the damping plate being movable relative to the blade to a very limited extent.

10. A flexible saw blade having teeth along one edge thereof and a damping plate secured to one face of the blade, one end of the damping plate being rigidly and immovably attached to the blade, and means for securing the remaining part of the damping plate and the blade while permitting limited relative movement between them.

11. A flexible saw blade having teeth along one edge thereof, a vibration damping plate on one surface of the blade, a connection securely fastening one end of the plate and blade together, and rivets connecting the blade and damping plate at intervals along the length and width of the saw blade, the rivets passing loosely through holes in the vibration damping plate which are larger in diameter than the rivets.

12. A saw for high speed reciprocation comprising a blade member and a damping plate member at one side of the blade member, rivets at intervals along the length and width of the blade member passing through the blade member and the vibration damping plate member, one of said members having holes therein through which the rivets pass, which are slightly larger in diameter than the rivets whereby limited relative flexing may occur between the two members, and means at one point in the length of the saw rigidly and immovably securing the vibration damping plate member and the blade member together.

13. A saw for high speed reciprocation comprising a blade member and a damping plate member at one side of the blade member, rivets at intervals along the length and width of the blade member passing through the blade member and the vibration damping plate member, one of said members having holes therein through which the rivets pass, which are slightly larger in diameter than the rivets whereby limited relative flexing may occur between the two members, the vibration damping member and the blade member being rigidly and immovably connected at one end only of the saw, the rivets being flush with the outer surfaces of the blade member and plate member.

14. A saw blade for sawing wood comprising an elongated flexible strip having a substantially rectilinear edge provided with kerf cutting members depending therefrom at spaced intervals along its length, each of said members comprising an extension presenting a face positioned at right angles to the plane of said strip, a kerf cutting point at the bottom of said extension, and a web-like fin trailing said extension and having a taper which diminishes in thickness in a direction away from said face, said face being operative to move sawdust along a kerf being cut by said point in one direction of blade movement, said fin being operative to deflect sawdust to a relative position in advance of said face in an opposite direction of blade movement.

15. A reciprocable saw blade for sawing wood having kerf cutting teeth at spaced intervals therealong, each of said teeth being spaced from said blade by a member having a face normal to the direction of reciprocating blade movement and a web-like fin tapering in a direction away from said face, said face being operable to move sawdust along a kerf being cut in one direction of blade movement, said fin being operable to deflect sawdust to one side thereof for relative movement to a position in advance of said face in an opposite direction of blade movement.

16. A saw blade tooth comprising a member having a surface normal to the path of tooth movement and a web-like fin having a tapering thickness which diminishes in a direction away from said face, and a cutting point at the lower end of said member, said face being operative to move sawdust along a kerf in one direction of movement of the tooth through the kerf, said fin being operative to deflect sawdust around said member to a relative position on the other side thereof upon movement of the tooth through the kerf in an opposite direction.

17. A flexible saw blade having teeth along an edge thereof for cutting a kerf in wood upon reciprocation of the saw, said saw being reciprocable over a path of insufficient length to carry all of said teeth to a position out of said kerf, and means for moving sawdust cut by teeth continuously within said kerf to a position from which it may be discharged therefrom comprising a plurality of wedge shaped members, there being one of said members for each of said teeth, each of said members having a surface normal to the path of movement of the saw in said kerf and a fin tapering in a direction away from said surface, said surface being operative to move sawdust through said kerf in one direction of movement of said blade, said fin being operative to deflect the sawdust out of the path of movement of said member in an opposite direction of movement of the blade, the action of said members being effective to continuously move sawdust through said kerf from a position in advance of one of said members to positions in advance of other of said members, said action continuing progressively until the sawdust is discharged from one end of the kerf.

18. A flexible saw blade having teeth along an edge thereof for cutting a kerf in wood upon reciprocation of the saw, said saw being reciprocable over a path of insufficient length to carry all of said teeth to a position out of said kerf, and means for systematically and progressively moving sawdust through the kerf and out of the end thereof comprising a plurality of members at spaced intervals along the saw blade including a flat-faced part operable in one direction of reciprocation of the saw blade to move the sawdust with the blade, and a wedge-shaped part operable in an opposite direction of reciprocation to move by the sawdust without disturbing its position.

19. Apparatus for sawing wood comprising, in combination, a saw blade having kerf cutting teeth along one edge thereof, and motor means for reciprocating the blade at high speed through a stroke of a length substantially shorter than the length of the kerf being cut, the length of stroke being such that a substantial number of the kerf cutting teeth remain within the kerf during the entire cutting operation, each of said teeth comprising a member having a surface normal to the path of tooth movement and a web-like fin having a tapering thickness which diminishes in a direction away from said face, and a cutting point at the lower end of said member, said face being operative to move sawdust along a kerf in one direction of movement of the tooth through the kerf, said fin being operative to deflect sawdust around said member to a relative position on the other side thereof upon movement of the tooth through the kerf in an opposite direction, whereby reciprocating movement of the blade through a short stroke is effective to move sawdust past reciprocating teeth to the end of the kerf.

20. Apparatus for sawing wood comprising, in combination, a saw blade having kerf cutting teeth along one edge thereof, and motor means for reciprocating the blade at high speed through a stroke of a length substantially shorter than the length of the kerf being cut, the length of stroke being such that a substantial number of the kerf cutting teeth remain within the kerf during the entire cutting operation, and means for systematically and progressively moving sawdust through the kerf and out of the end thereof comprising a plurality of members at spaced intervals along the saw blade including a flat-faced part operable in one direction of reciprocation of the saw blade to move the sawdust with the blade, and a wedge-shaped part operable in an opposite direction or reciprocation to move by the sawdust without disturbing its position.

21. Wood sawing apparatus comprising, in combination, a reciprocable saw blade having kerf cutting teeth along one edge thereof, a driving rig supporting the blade at one end thereof and including a motor operated driving connection for reciprocating the blade through a stroke shorter than the length of the kerf to be cut, and means for systematically moving through and out of the end of a kerf sawdust formed by teeth which never move out of the kerf comprising a plurality of members at spaced intervals along the length of the saw, each of said members having a web-like fin with a flat front face operable in one direction of reciprocating movement of the blade to move the sawdust through the kerf, and a trailing tapering portion operable in an opposite direction of reciprocatory movement to move by the sawdust without disturbing its position in the kerf, whereby sawdust in the kerf is continuously moved to the end thereof.

CLARENCE E. JENKINS.

(References on following page)

REFERENCES CITED

The following references are of record in the file of this patent:

UNITED STATES PATENTS

| Number | Name | Date |
|---|---|---|
| 267,958 | Wills | Nov. 21, 1882 |
| 495,345 | Junge | Apr. 11, 1893 |
| 735,586 | Rabie | Aug. 4, 1903 |
| 799,889 | Bryan | Sept. 19, 1905 |
| 884,744 | Libby et al. | Apr. 14, 1908 |
| 940,518 | Dunn et al. | Nov. 16, 1909 |
| 1,198,371 | Nelson | Sept. 12, 1916 |
| 1,644,432 | Howland | Oct. 4, 1922 |
| 1,726,863 | Singer | Sept. 3, 1929 |
| 1,838,125 | Wirtz | Dec. 29, 1931 |
| 2,023,726 | Emery | Dec. 10, 1935 |
| 2,375,651 | Henry | May 8, 1945 |

FOREIGN PATENTS

| Number | Country | Date |
|---|---|---|
| 1,197 | Great Britain | Mar. 19, 1880 |
| 68,684 | Germany | May 19, 1893 |
| 25,534 | Switzerland | Mar. 5, 1902 |
| 5,991 | France | May 16, 1906 |
| (1st addition to No. 358,429) | | |
| 123,375 | Great Britain | Feb. 17, 1919 |
| 64 | Australia | Jan. 11, 1926 |
| 182,776 | Switzerland | May 16, 1936 |
| 183,743 | Switzerland | July 16, 1936 |